United States Patent
Chen et al.

(10) Patent No.: US 9,223,385 B2
(45) Date of Patent: Dec. 29, 2015

(54) RE-DRIVER POWER MANAGEMENT

(71) Applicant: Intel Corporation, Santa Clara, CA (US)

(72) Inventors: Huimin Chen, Portland, OR (US); Howard Heck, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 404 days.

(21) Appl. No.: 13/720,436

(22) Filed: Dec. 19, 2012

(65) Prior Publication Data

US 2014/0173303 A1  Jun. 19, 2014

(51) Int. Cl.
*G06F 1/32* (2006.01)
*G06F 13/40* (2006.01)

(52) U.S. Cl.
CPC .......... *G06F 1/3253* (2013.01); *G06F 13/4004* (2013.01); *Y02B 60/1228* (2013.01); *Y02B 60/1235* (2013.01); *Y02B 70/126* (2013.01)

(58) Field of Classification Search
CPC ....... G06F 1/3202; G06F 1/3231; G06F 1/26; G06F 1/206; G06F 1/3228; G06F 1/08; G06F 1/3289; G06F 1/266; H04L 12/12; H04L 12/10
USPC .......................................... 713/300, 310, 320
See application file for complete search history.

(56) References Cited

U.S. PATENT DOCUMENTS

| | | | | |
|---|---|---|---|---|
| 5,781,784 A | * | 7/1998 | McKinley | ..................... 713/320 |
| 5,890,004 A | * | 3/1999 | Poisner | ........................ 713/300 |
| 2002/0010821 A1 | | 1/2002 | Yu et al. | |
| 2006/0174142 A1 | * | 8/2006 | Lin et al. | ....................... 713/300 |
| 2006/0268975 A1 | * | 11/2006 | Bors | ............................ 375/238 |
| 2007/0110199 A1 | | 5/2007 | Momtaz et al. | |
| 2007/0206641 A1 | | 9/2007 | Egan | |
| 2010/0105319 A1 | | 4/2010 | Yeung et al. | |
| 2011/0066869 A1 | * | 3/2011 | Wakrat et al. | ................. 713/324 |
| 2012/0311359 A1 | * | 12/2012 | Jaramillo | ..................... 713/321 |

FOREIGN PATENT DOCUMENTS

EP    2 530 601 A2    12/2012
WO    2014/099524 A1    6/2014

OTHER PUBLICATIONS

International Search Report and Written Opinion received for PCT Patent Application No. PCT/US2013/074284, mailed on Mar. 28, 2014, 12 pages.
Office Action for Taiwan Patent Application No. 102144282 (English Translation attached), dated Apr. 7, 2015, 10 pages.

* cited by examiner

*Primary Examiner* — Zahid Choudhury
(74) *Attorney, Agent, or Firm* — International IP Law Group, P.L.L.C.

(57) ABSTRACT

The present disclosure provides techniques for increasing the power efficiency of re-drivers by providing a technique for a re-driver to recognize a variety of power states. A message generator may be located in a host device and may encode a signal indicating a change in a power state. The message may be transmitted to a message decoder located in a re-driver. The message decoder may decode the message and the re-driver may enter a power state in response to the decoded message.

30 Claims, 8 Drawing Sheets

100

300

400

| Link State | PWM Message | Re-Driver State | Trigger | Equivalent PCIe/USB3 Link State |
|---|---|---|---|---|
| Active | | RD0 (Active) | | L0, U0 |
| EI | | RD0s (Standby) | EI | Equivalent to L0s, U1 |
| EI | LPM1 | RD1 (Deep Low Power State) | EI + PWM | L1, U2 |
| EI | LPM2 | Rd2 (Deeper Low Power State) | EI + PWM | L2, L3, U3 |

RE-DRIVER POWER MANAGEMENT

TECHNICAL FIELD

The present disclosure relates to an Input/Output (I/O) signaling protocol. More specifically, this disclosure relates to a signaling protocol for power management of a re-driver.

BACKGROUND

As data rate of high-speed I/Os continues to increase, the relative length of cables that may be supported tends to decrease due to signal degradation. To increase the length of cables that may be supported, re-drivers are often employed to decrease signal degradation. In particular, re-drivers may amplify a signal and, in the case of differential signaling, may re-time the signals to re-syncronize the signals.

BRIEF DESCRIPTION OF THE DRAWINGS

Certain exemplary embodiments are described in the following detailed description and in reference to the drawings, in which:

FIG. 5 is a table illustrating link states and their respective triggers;

DETAILED DESCRIPTION OF SPECIFIC EMBODIMENTS

This disclosure provides techniques for increasing the power efficiency of re-drivers. In particular, some embodiments described herein provide techniques for re-drivers to distinguish power levels, including a variety of low power levels.

As the data rate of high-speed IOs continues to increase, the relative cable length that may be supported starts to decrease accordingly. This is because channels of galvanic interconnect present themselves as a low pass filter, thus leading to signal quality degradation not only in the voltage domain due to channel loss, but jitter in the time domain due to intersymbol interference (ISI). The longer the channel, the more attenuation and distortion a signal will get when traveling through the channel. To overcome the growing signal quality degradation as data rate increases while still achieving the same reach on the same channel, re-drivers can be used to recondition the signal. This can be done by employing a mechanism of channel equalization through a combination transmitter pre-equalization and receiver post-equalization to offset the channel attenuation and minimize the channel distortion.

Although re-drivers can improve the channel reach, they suffer significant drawbacks in device power management when the high-speed I/O enters a lower power state, mainly due to the limited awareness of the I/O activity. In the case of re-drivers used for PCIe or USB3 applications, the re-driver may only be aware of a few link states, such as connect, active, and electrical idle (EI). The re-driver is not capable of discerning if the link enters different low power states, such as L0s, L1, and L2/L3, in the case of PCIe applications, or U1, U2, and U3, in the case of USB3 applications. If the re-driver architecture employs a single low power state reflecting the link in EI, the re-driver may consume idle power in the scale of tens of mW. By enabling a re-driver to identify a broader range of power states, the re-driver can be made more energy efficient, thus enabling the use of re-drivers in highly energy efficient systems.

Figure 1:
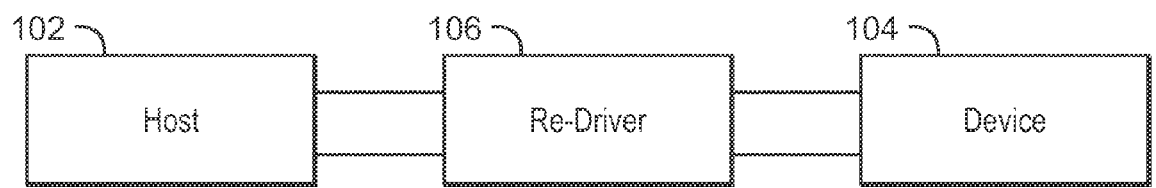
FIG. 1 is a block diagram of a high-speed interconnect link topology.

FIG. 1 is a block diagram of a high-speed interconnect link topology. A host 102 may be connected to a device 104 through a re-driver 106. The host 102 may be a computing device such as a mobile phone, a laptop computer, a desktop computer, or a tablet computer, among others. The device 104 may be a high speed Input/Output (IO) device, such as a device including a high speed, dual-simplex link. For example, the device 104 may be a USB device, such as a USB1 device, USB2 device, or USB3 device. As used herein, the term USB is used to refer to any USB protocol, including USB1. USB2, USB3, or any other USB protocol, including USB protocols that may be developed in the future. In another example, the device 104 may include combined links, such as a Thunderbolt interface. In a further example, the device 104 may be a PCIe device. In an example, the host 102, the re-driver 106, and the device 104 may be connected through a system bus and/or interfaces. The re-driver 106 may be adapted to receive a message, such as a PWM message, instructing the re-driver 106 to enter a particular power state. The re-driver 106 may enter the power state in accordance with the instructions included in the message. The re-driver 106 is described further below, in relation to FIGS. 5 and 7.

Figure 2:
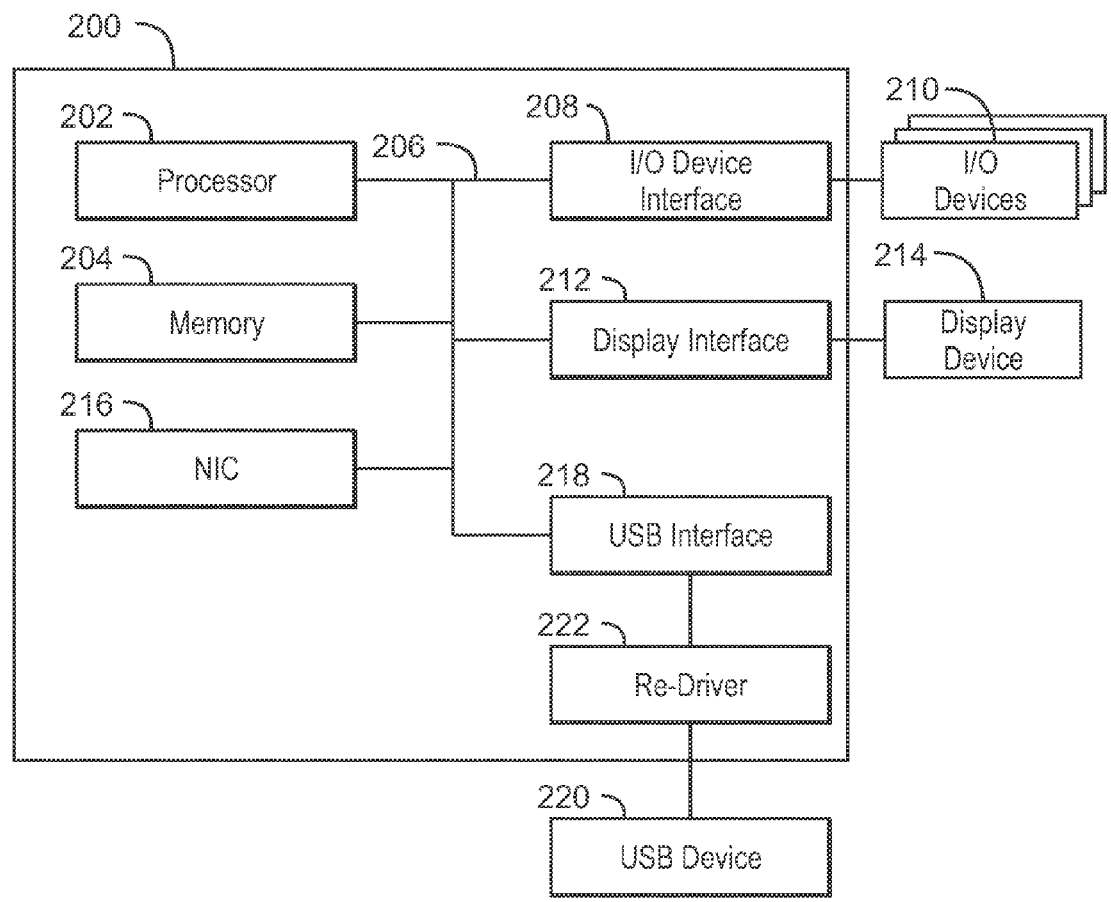
FIG. 2 is a block diagram of a computing system.

FIG. 2 is a block diagram of a computing system in accordance with an embodiment. The computing system 200 may be, for example, a mobile phone, laptop computer, desktop computer, or tablet computer, among others. The computing system 200 may include a processor 202 that is adapted to execute stored instructions, as well as a memory device 204 that stores instructions that are executable by the processor 202. The processor 202 can be a single core processor, a multi-core processor, a computing cluster, or any number of other configurations. The memory device 204 can include random access memory (e.g., SRAM, DRAM, zero capacitor RAM, SONOS, eDRAM, EDO RAM, DDR RAM, RRAM, PRAM, etc.), read only memory (e.g., Mask ROM, PROM, EPROM, EEPROM, etc.), flash memory, or any other suitable memory systems.

The processor 202 may be connected through a system bus 206 (e.g., PCI, ISA, PCI-Express, HyperTransport®, NuBus, etc.) to an input/output (I/O) device interface 208 adapted to connect the computing system 200 to one or more I/O devices 210. The I/O devices 210 may include, for example, a keyboard and a pointing device, wherein the pointing device may include a touchpad or a touchscreen, among others. The I/O devices 210 may be built-in components of the computing system 200, or may be devices that are externally connected to the computing system 200.

The processor 202 may also be linked through the system bus 206 to a display interface 212 adapted to connect the computing system 200 to a display device 214. The display device 214 may include a display screen that is a built-in component of the computing system 200. The display device 214 may also include a computer monitor, television, or projector, among others, that is externally connected to the computing system 200.

A network interface card (NIC) 216 may be adapted to connect the computing system 200 through the system bus 206 to a network (not depicted). The network (not depicted) may be a wide area network (WAN), local area network (LAN), or the Internet, among others.

A USB interface 218 may be adapted to connect to the computing system 200 through the system bus 206. The USB interface 218 may transmit and receive data from USB devices 220 through a re-driver 222. The re-driver 222 may boost the amplitude of the signal, in order to overcome signal quality degradation. When employing differential signaling, the re-driver 222 may also re-time the signals in order to sync the signals and reduce interference. The re-driver may be adapted to receive a power state message, instructing the re-driver to enter a different power state. For example, the re-driver may include a receiver for receiving the power state message, such as from a message generator in a host or a device. The power state message may include a cycling between states, such as between an electrical idle state and a pulsed state. For example, the power state message may be a PWM modulated signal, as described further in relation to FIGS. 3 and 4.

It is to be understood that the block diagram of FIG. 2 is not intended to indicate that the computing system 200 is to include all of the components shown in FIG. 2. Rather, the computing system 200 can include fewer or additional components not illustrated in FIG. 2 (e.g., additional USB ports, additional USB interfaces, additional network interfaces, etc.).

Figure 3:
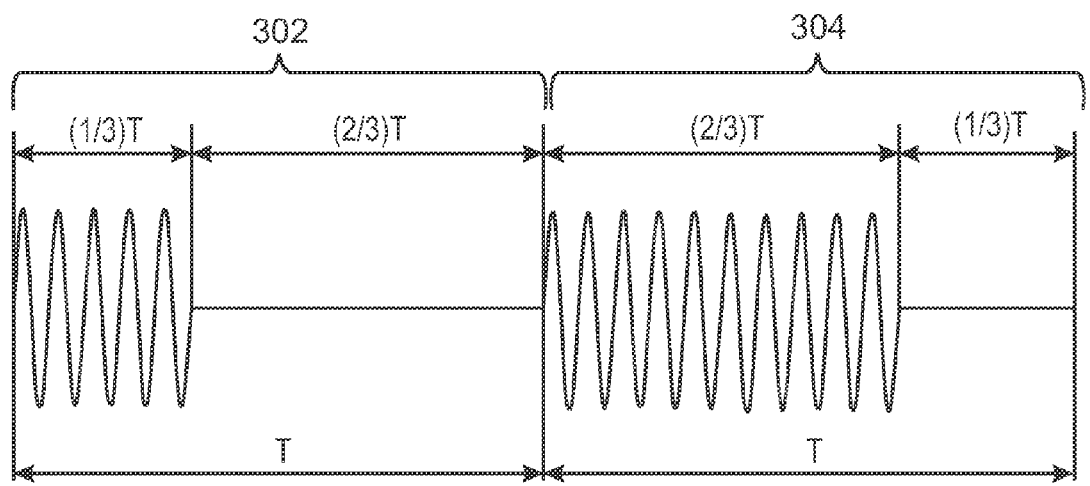
FIG. 3 is an illustration of a PWM signal based on pulsed state and electrical idle EI state.

FIG. 3 is an illustration of a PWM signal based on pulsed state and electrical idle (EI) state in accordance with an embodiment. In particular, FIG. 3 illustrates a binary pulse width modulation (PWM) signal 300. A format of a PWM signal based on a low frequency periodic signal (LFPS) is formed by two distinct signaling states, a pulsed state and an electrical idle (EI) state. A pulsed state is a state when signals are transmitted or detected. An EI state is a state in which the link is electrical idle, and only the common mode voltage is maintained. A logic '0' 302 may be represented within a period (T) by a preceding pulsed state of one-third (⅓) of T, followed by an EI state the rest (⅔) of the period T. A logic '1' 304 may be represented by a preceding pulsed state of two-thirds (⅔) of period T, followed by an EI state the rest (⅓) of the period T.

Figure 4:
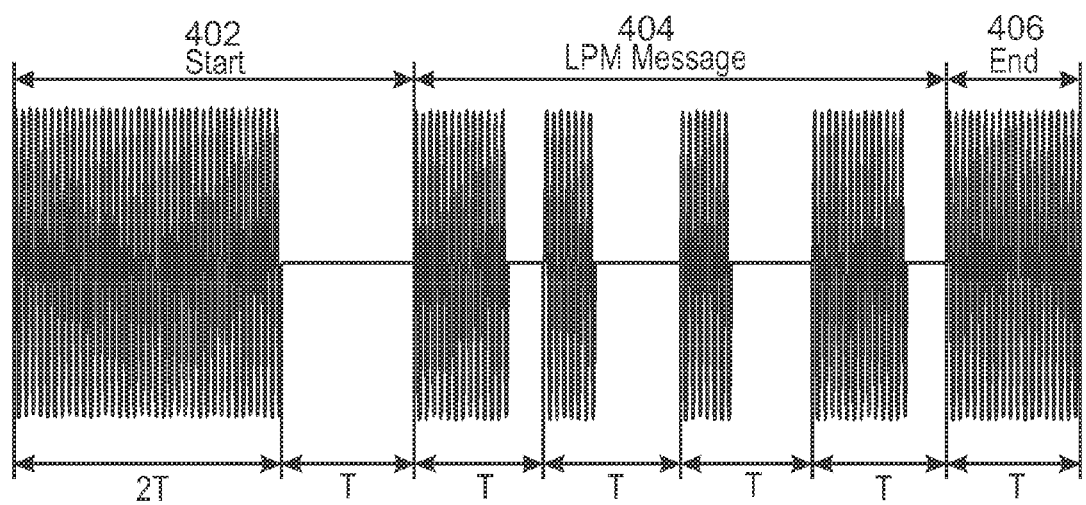
FIG. 4 is an illustration of an example of a fixed-width PWM message.

FIG. 4 is an illustration of an example of a fixed-width PWM message in accordance with an embodiment. A fixed-width PWM message 400 may be constructed to allow for a host port or device port to inform a re-driver about changes in link power states. The fixed-width PWM message 400 may be an 8-bit link power state message. The first two periods may be constructed as a continuous pulsed state 2T. The continuous pulsed state 2T may be followed by one period of electrical idle (EI) state, the combination of the continuous pulsed state 2T and the one period of EI state acting as the start sequence 402 of the PWM message 400. The start sequence 402 may act as a wake-up signal to a receiver. In particular, the start sequence may inform the receiver that a message is being transmitted. A link power management (LPM) message 404, such as a 4-bit LPM message, may be appended after the start sequence. The message may comprise a controlled cycling between idle and link power management (LPM) which represents a PWM message 400. The cycling between idle and LPM may be represented by a series of logic 1s and 0s. The series of logic 1s and 0s may be the LPM message 404 and may provide instructions on which power state to enter. For example, the LPM message 404 shown in FIG. 4 represents a data sequence of '1001', The LPM message 404 may be followed by one period of pulsed state 406. The period of pulsed state 406 may signal to the receiver that the end of the message has been reached. After receiving the 'end' 406, the re-driver may enter a different power state, based on the message 400.

FIG. 5 is a table illustrating link states and their respective triggers in accordance with an embodiment. A trigger is the action that causes a change in a power state. By employing a fixed-width PWM message, a re-driver may be explicitly aware of a link state and take proper re-driver power state mapping accordingly. In an active link state, a re-driver may receive no PWM message and the re-driver state may be active (RD0). RD0 is an active state in which the re-driver is receiving and regenerating data packets from both a host and a device. In addition, a corresponding host or device state, such as a PCIe/USB3 link state, may be L0 or U0, respectively. If a re-driver detects a lack of signaling activity, the re-driver may enter a standby state (RD0s). RD0s is a state in which an electric idle (EI) state is detected and no packets are being forwarded. The re-driver may be in a standby mode ready to resume operation as soon as it detects the break of the EI state. A corresponding host or device state, such as PCIe/USB3 link state, may be L0s or U1, respectively, If a re-driver detects an electrical idle state and receives a particular signal (LPM1), such as a PWM message, the re-driver may enter low power state 2, a deep low power state (RD1). RD1 may be a state where EI is detected, and the re-driver may disable more circuits in order to save more power with extended exit latency. The PWM message may be received in a re-driver and may be sent by a host, a device, or both a host and a device. A corresponding PCIe/USB3 link state may be L1 or U2, respectively. If a re-driver detects an electrical idle state and receives another particular signal (LPM2), the re-driver may enter low power state 3, a deeper low power state (RD2). RD2 is a more aggressive low power state than RD1 where longer exit latency may be allowed, and the re-driver may be allowed to disable additional circuits to save even more power. The PWM message may be received in a re-driver and may be sent by a host, a device, or both a host and a device. A corresponding PCIe/USB3 link state may be L2, L3, or U3, respectively.

Figure 6:
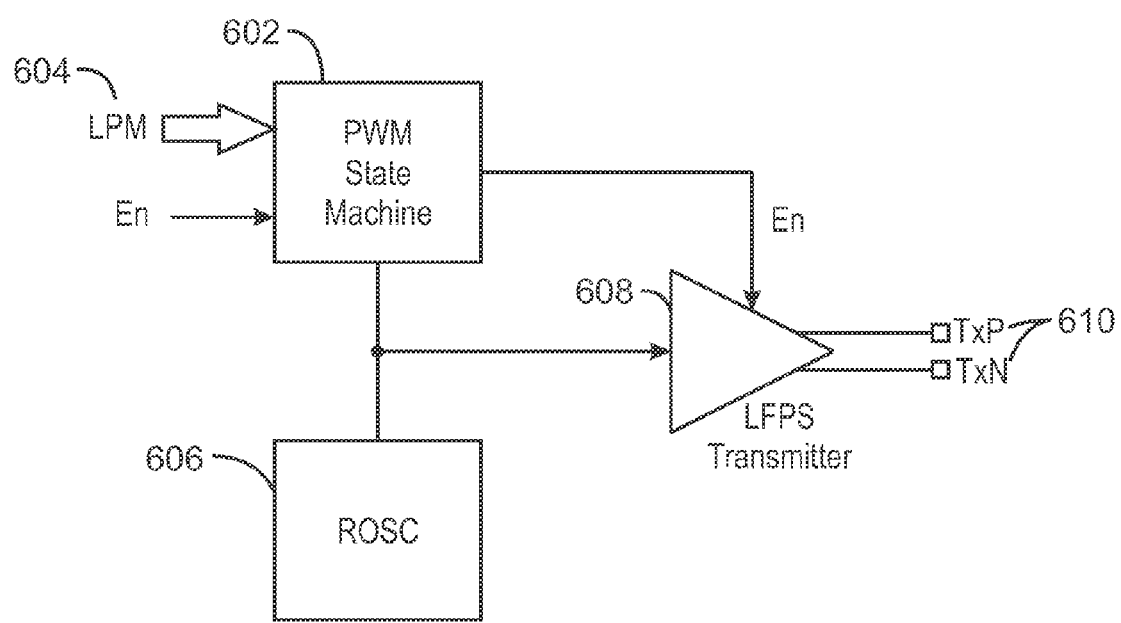
FIG. 6 is a block diagram of a PWM message generator.

FIG. 6 is a block diagram of a PWM message generator in accordance with an embodiment. The message generator 600 may be located in a host, such as the host port. In another example, the message generator 600 may be located in a device, such as the device port. In a further example, a first message generator 600 may be located in a host, such as a host port, and a second message generator 600 may be located in a device, such as a device port. The host may enter a different power state. Immediately before entering the different power state, the host may indicate the change in power state to a PWM state machine 602 via a link power management (LPM) 604. Indicating the power state change to the PWM state machine 602 may enable (En) the message generator 600 to begin transmission of a PWM message. A ring oscillator (Rose) 606 may send out a signal. The signal may oscillate between high and low. The Rose 606 may be coupled to a low frequency periodic signal (LFPS) transmitter 608 and may send the oscillating signal to the transmitter 608. The timing of the ring oscillator 606 may be controlled by the PWM state machine 602, which may be coupled to both the Rose 606 and the LFPS transmitter 608. By controlling the timing of the ring oscillator 606, the PWM state machine 602 may create a particular PWM message, signaling the power state change indicated by the host (not pictured).

The PWM message may be formatted such as illustrated in FIG. 4. In particular, the PWM message may be preceded by a 'start' message, indicating to a receiver that a message is beginning. Further, the PWM message may be followed by an 'end' message, indicating the PWM message is complete. The PWM message may be a series of logic 1s and 0s, represented by the configured oscillating signal.

When the PWM message is configured in the LFPS transmitter 608, the LFPS transmitter 608 may send the PWM message to a message detector via existing data channels 610 TxP and TxN. The data channels may carry differential signals. In addition, the LFPS transmitter 608 may be coupled to the data channels in parallel with a USB transmitter (not pictured), The USB transmitter may be a USB SuperSpeed transmitter. The LFPS transmitter 608 may not actively transmit messages when the USB transmitter is actively sending messages. The implementation of a PWM message generator 600 may be contained within an existing LFPS circuitry based on a local clock generator (Rosc) 606 and an LFPS transmitter 608.

The block diagram of FIG. 6 is not intended to indicate that the message generator 600 is to include all of the components shown in FIG. 6. Further, the message generator 600 may include any number of additional components not shown in FIG. 6, depending on the details of the specific implementation.

Figure 7:
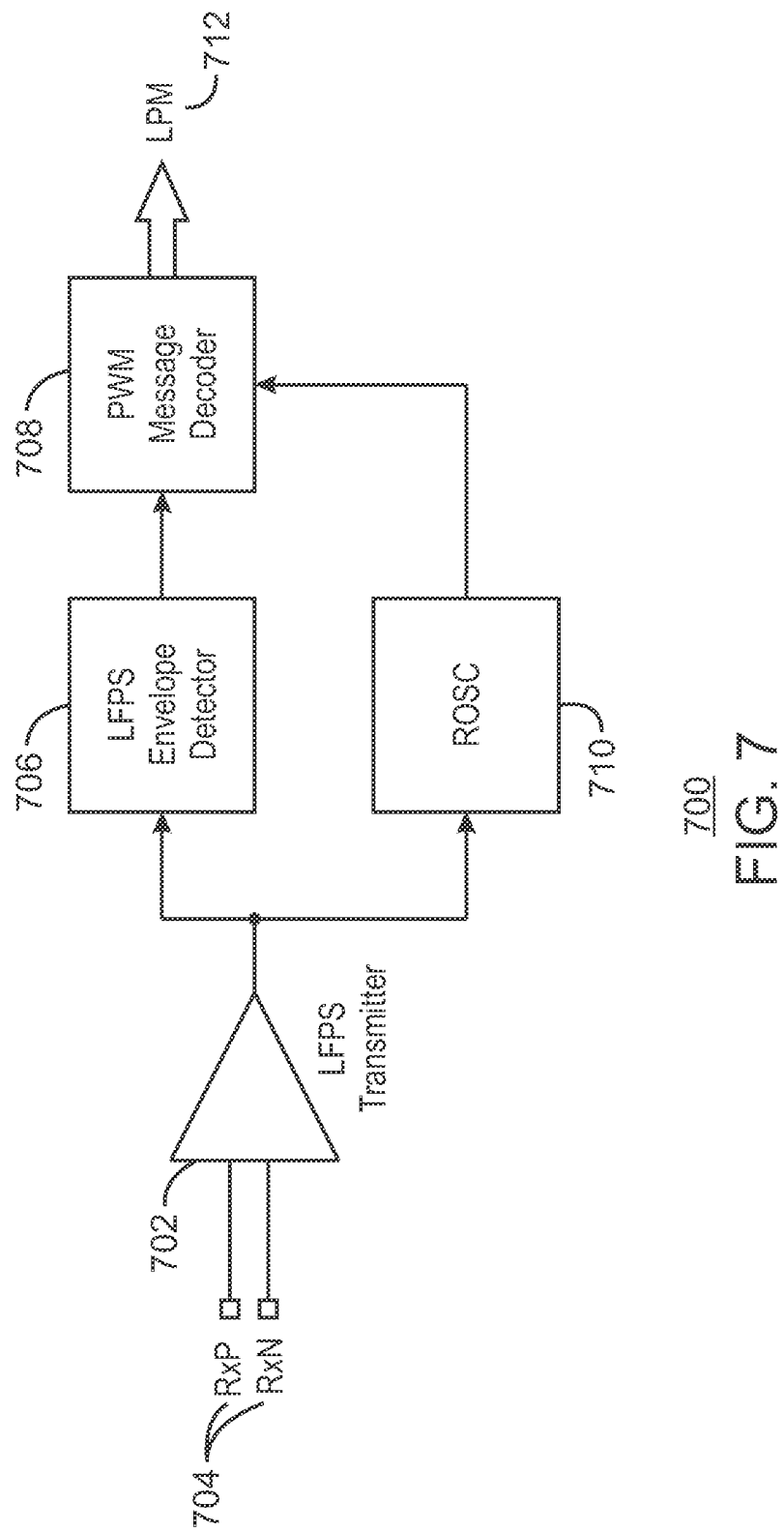
FIG. 7 is a block diagram of a PWM message detector.

FIG. 7 is a block diagram of a PWM message detector in accordance with an embodiment. The message detector 700 may include a receiver 702, such as a low frequency periodic signal (LFPS) receiver 702. The LFPS receiver 702 may be connected in parallel to existing data channels 704 RxP and RxN and may receive a PWM message sent by a message generator located in a host or a device. When the message is received in the receiver 702, the message may be sent to an LPFS envelope detector 706. The message may be an oscillating signal representing binary information. The envelope detector 706 may extract the binary information, the series of 1s and 0s, from the oscillating signal. The binary information may be sent to a PWM message decoder 708. The PWM message decoder 708 may decode the binary information to determine the power management state the re-driver is instructed to enter. The Rosc may operate the state machine and may assist in message detection, decoding, and re-generation.

When the PWM message decoder 708 has decoded the message, the PWM message decoder 708 sends the message to the re-driver link power management (LPM) 712. The link power management 712 places the re-driver in a power state, based on the decoded message. The power state may be one of active, standby, deep low power state, and deeper low power state. The PWM message detector 700 may be contained within an existing LFPS circuitry based on a Rosc and an LPFS transceiver.

The block diagram of FIG. 7 is not intended to indicate that the message detector 700 is to include all of the components shown in FIG. 7. Further, the message detector 700 may include any number of additional components not shown in FIG. 7, depending on the details of the specific implementation.

Figure 8:
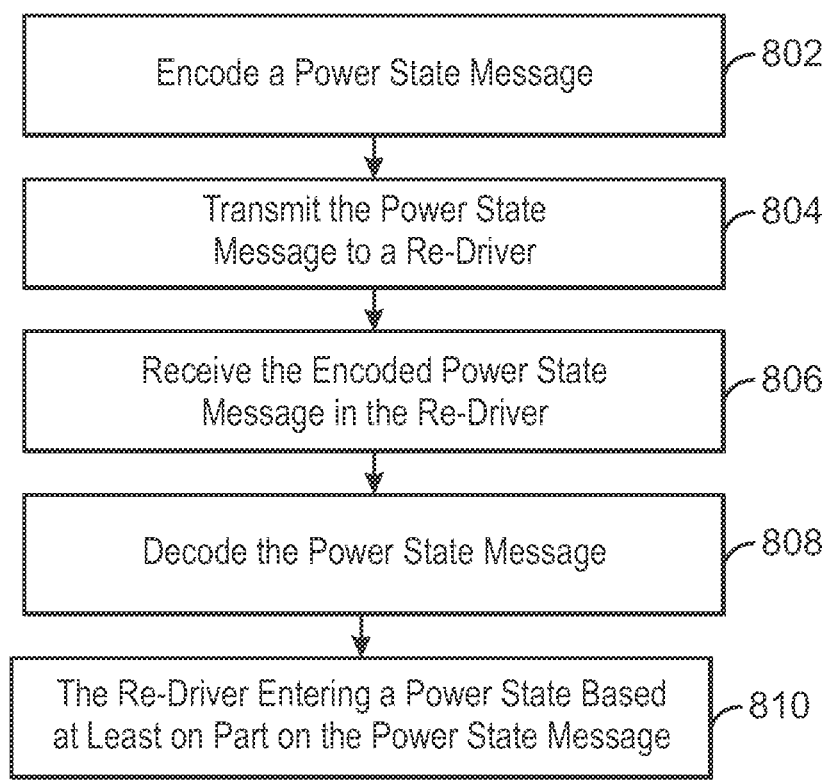
FIG. 8 is a flowchart illustrating a method of detecting a link power state.

FIG. 8 is a flowchart illustrating a method of detecting a link power state in accordance with an embodiment. At block 802, a power state message may be encoded. In an example, the power state message may be a fixed-width pulse width modulation (PWM) message. The message may be encoded in a state machine of a message generator. The message generator may be located in a host or in a device. In an example, the host may be a computing device, such as a laptop or a desktop. In another example, the device may be a USB device, such as a USB2 device, a USB3 device, or a USB3.5 device. In another example, the device may be a PCIe device. The state machine may be a pulse width modulation (PWM) state machine. The state machine may be coupled to a clock such as a ring oscillator (Rosc) clock. The clock may send a signal oscillating between high and low, enabling the state machine to encode the power state message. The state machine may also be electrically coupled to a transmitter.

At block 804, the power state message may be transmitted to a re-driver. In an example, the transmitter may be a low frequency periodic signal (LFPS) transmitter. The transmitter may transmit the encoded power state message to a re-driver via data channels. The data channels may carry differential signals, thereby reducing interference.

At block 806, the encoded power state message may be received in the re-driver. The encoded power state message may be received in a message detector integrated with a re-driver. In particular, the encoded power state message may be received, via data signals carrying differential signals, in a receiver. The receiver may be a low frequency periodic signal (LFPS) receiver. The encoded signal may pass through an envelope detector to a message decoder. The message decoder may be a PWM message decoder. The message decoder may be electrically coupled to a clock generator, such as a ring oscillator.

At block 808, the power state message may be decoded. In particular, the power state message may be decoded by the message decoder. The Rosc may be enabled by the detection of the message. The Rosc may supply an over-sampling clock to a PWM message decoder to decode the message after the envelope detector.

At block 810, the re-driver may enter a power state based at least in part on the power-state message. The power state may be one of active, standby, deep low power state, or deeper low power state. The re-driver may enter the power state based on a combination of the decoded power state message and detection of an electrical idle (EI) link state. By employing a fixed-width PWM message, the re-driver may be explicitly aware of the link state and take proper re-driver power state mapping.

Example 1

A method is disclosed herein. The method includes receiving a power state message in a re-driver. The power state message may correspond to a power state of a port coupled to the re-driver. The method also includes decoding the power state message and entering the re-driver into a re-driver power state based on the power state message. The power state message includes a cycling between an electrical idle state and a pulsed state, If the power state of the port is a USB U2 state, the re-driver power state may be an RD1 power state. If the power state of the port is a USB U3 state, the re-driver power state may be an RD2 power state. The re-driver may enter one of at least four different power states. The method may include entering a power state based on a combination of the power state message and detection of an electrical idle (EI) link state. The power state message may be a pulse width modulation (PWM) message. The power state message may be received from data channels carrying differential signals.

Example 2

A method is disclosed herein. The method includes detecting a link state of a port, encoding a power state message corresponding to the power state of the port, and transmitting the power state message to a re-driver. The power state message includes a cycling between an electrical idle state and a pulsed state.

The message generator may be located in one of a host and a device. The power state message may be a pulse width modulation (PWM) message. The power state message may be transmitted by a low frequency periodic signal transmitter.

The power state message may be transmitted via data channels carrying differential signals.

Example 3

An electronic device is disclosed herein. The electronic device includes a transmitter and a state machine to control the transmitter to encode a pulse width modulated (PWM) power state message and transmit the encoded power state message to a re-driver.

The transmitter may be a low frequency periodic signal (LFPS) transmitter. The power state message may be transmitted over data channels carrying differential signals. The power state message may be transmitted from a high speed, dual-simplex device. The power state message may be transmitted from one of a USB device, a USB2 device, a USB3 device, a PCIe device, or a Thunderbolt device.

Example 4

A re-driver is disclosed herein. The re-driver includes a receiver to receive a pulse width modulated (PWM) power state message from a port coupled to the re-driver. The re-driver also includes a message decoder to decode the PWM power state message and a controller to enter the re-driver into a re-driver power state based on the power state message.

The receiver may be a low frequency periodic signal (LFPS) receiver. The re-driver may enter a power state in response to a combination of detection of an electrical idle (EI) link state and the power state message. The power state message may be received from data channels carrying differential signals.

Example 5

A system is disclosed herein. The system includes a message generator. The message generator includes a state machine to encode a power state message and a transmitter to transmit the encoded power state message. The system also includes a message detector. The message detector includes a receiver to receive a transmitted encoded power state message and a message decoder to decode an encoded power state message. The message detector is integrated with a re-driver and the re-driver enters a power state based on the power state message.

The power state message may be a pulse width modulation (PWM) message. If the power state of the port is a USB U2 state, the re-driver power state may be an RD1 power state. If the power state of the port is a USB U3 state, the re-driver power state may be an RD2 power state. The port may be disposed in a device including a high-speed, dual-simplex link. The port may be disposed in one of a USB device, a USB2 device, a USB3 device, a PCIe device, or a Thunderbolt device. The re-driver may enter one of at least four different power states. The re-driver may enter the power state based on the power state message and detection of an electrical idle (EI) link state. The power state message may be transmitted over data channels carrying differential signals.

In the foregoing description and claims, the terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other, "Coupled" may mean that two or more elements are in direct physical or electrical contact. However, "coupled" may also mean that two or more elements are not in direct contact with each other, but yet still co-operate or interact with each other.

Some embodiments may be implemented in one or a combination of hardware, firmware, and software. Some embodiments may also be implemented as instructions stored on a machine-readable medium, which may be read and executed by a computing platform to perform the operations described herein. A machine-readable medium may include any mechanism for storing or transmitting information in a form readable by a machine, e.g., a computer. For example, a machine-readable medium may include read only memory (ROM); random access memory (RAM); magnetic disk storage media; optical storage media; flash memory devices; or electrical, optical, acoustical or other form of propagated signals, e.g., carrier waves, infrared signals, digital signals, or the interfaces that transmit and/or receive signals, among others.

An embodiment is an implementation or example. Reference in the specification to "an embodiment," "one embodiment," "some embodiments," "various embodiments," or "other embodiments" means that a particular feature, structure, or characteristic described in connection with the embodiments is included in at least some embodiments, but not necessarily all embodiments, of the inventions. The various appearances of "an embodiment," "one embodiment," or "some embodiments" are not necessarily all referring to the same embodiments. Elements or aspects from an embodiment can be combined with elements or aspects of another embodiment.

Not all components, features, structures, characteristics, etc. described and illustrated herein need be included in a particular embodiment or embodiments. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

It is to be noted that, although some embodiments have been described in reference to particular implementations, other implementations are possible according to some embodiments. Additionally, the arrangement and/or order of circuit elements or other features illustrated in the drawings and/or described herein need not be arranged in the particular way illustrated and described. Many other arrangements are possible according to some embodiments.

In each system shown in a figure, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

In the preceding description, various aspects of the disclosed subject matter have been described. For purposes of explanation, specific numbers, systems and configurations were set forth in order to provide a thorough understanding of the subject matter. However, it is apparent to one skilled in the art having the benefit of this disclosure that the subject matter may be practiced without the specific details. In other instances, well-known features, components, or modules were omitted, simplified, combined, or split in order not to obscure the disclosed subject matter.

While the disclosed subject matter has been described with reference to illustrative embodiments, this description is not intended to be construed in a limiting sense. Various modifications of the illustrative embodiments, as well as other embodiments of the subject matter, which are apparent to persons skilled in the art to which the disclosed subject matter pertains are deemed to lie within the scope of the disclosed subject matter.

While the present techniques may be susceptible to various modifications and alternative forms, the exemplary examples discussed above have been shown only by way of example. It is to be understood that the technique is not intended to be limited to the particular examples disclosed herein. Indeed, the present techniques include all alternatives, modifications, and equivalents falling within the true spirit and scope of the appended claims.

What is claimed is:

1. A method, comprising:
receiving a power state message in a re-driver, the power state message corresponding to a power state of a port coupled to the re-driver;
decoding the power state message; and
entering the re-driver into a re-driver power state based on a combination of the power state message and detection of an electrical idle (EI) link state; and
wherein the power state message comprises a cycling between an electrical idle state and a pulsed state.

2. The method of claim 1, wherein if the power state of the port is a USB U2 state, the re-driver power state is an RD1 power state.

3. The method of claim 1, wherein if the power state of the port is a USB U3 state, the re-driver power state is an RD2 power state.

4. The method of claim 1, wherein the re-driver enters one of at least four different power states.

5. The method of claim 1, wherein the power state message comprises a pulse width modulation (PWM) message.

6. The method of claim 1, wherein the power state message is received from data channels carrying differential signals.

7. The method of claim 1, wherein the power state message is transmitted from one of a USB device, a PCIe device, or a Thunderbolt device.

8. A method, comprising:
detecting a link state of a port;
encoding a power state message corresponding to the power state of the port; and
transmitting the power state message to a re-driver that will enter a re-driver power state based on a combination of the power state message and a detected electrical idle (EI) link state;
wherein the power state message comprises a cycling between an electrical idle state and a pulsed state.

9. The method of claim 8, wherein a message generator is located in one of a host and a device.

10. The method of claim 8, wherein the power state message comprises a pulse width modulation (PWM) message.

11. The method of claim 8, wherein the power state message is transmitted by a low frequency periodic signal transmitter.

12. The method of claim 8, wherein the power state message is transmitted via data channels carrying differential signals.

13. The method of claim 8, wherein the power state message is transmitted from one of a USB device, a PCIe device, or a Thunderbolt device.

14. An electronic device, comprising:
a processor;
a transmitter; and
a state machine to control the transmitter to instruct a processor to encode a pulse width modulated (PWM) power state message and transmit the encoded power state message to a re-driver, the re-driver to enter a re-driver power state based on a combination of the power state message and a detected electrical idle (EI) link state.

15. The system of claim 14, wherein the transmitter is a low frequency periodic signal (LFPS) transmitter.

16. The system of claim 14, wherein the power state message is transmitted over data channels carrying differential signals.

17. The system of claim 14, wherein the power state message is transmitted from a device comprising a high speed, dual-simplex link.

18. The system of claim 14, wherein the power state message is transmitted from one of a USB device, a PCIe device, or a Thunderbolt device.

19. A re-driver, comprising:
a receiver to receive a pulse width modulated (PWM) power state message from a port coupled to the re-driver and store the PWM power state message in a memory;
a message decoder to decode the PWM power state message to generate a decoded power state message; and
a controller to enter the re-driver into a re-driver power state based on a combination of the decoded power state message and a detected electrical idle (EI) link state.

20. The system of claim 19, wherein the receiver is a low frequency periodic signal (LFPS) receiver.

21. The system of claim 19, wherein the power state message is received from data channels carrying differential signals.

22. The system of claim 19, wherein the power state message is transmitted from one of a USB device, a PCIe device, or a Thunderbolt device.

23. A system, comprising:
a message generator comprising:
a state machine to encode a power state message and
a transmitter to transmit the encoded power state message; and
a message detector comprising:
a receiver to receive a transmitted encoded power state message and
a message decoder to decode an encoded power state message,
wherein the message detector is integrated with a re-driver and wherein the re-driver is to enter a power state based on a combination of the power state message and a detected electrical idle (EI) link state.

24. The system of claim 23, wherein the power state message comprises a pulse width modulation (PWM) message.

25. The system of claim 23, wherein if the power state of the port is a USB U2 state, the re-driver power state is an RD1 power state.

26. The system of claim 23, wherein if the power state of the port is a USB U3 state, the re-driver power state is an RD2 power state.

27. The system of claim 23, wherein the port is disposed in a device comprising a high-speed, dual-simplex link.

28. The system of claim 23, wherein the port is disposed in one of a USB device, a PCIe device, or a Thunderbolt device.

29. The system of claim 23, wherein the re-driver enters one of at least four different power states.

30. The system of claim 23, wherein the power state message is transmitted over data channels carrying differential signals.

* * * * *